United States Patent [19]

Payne et al.

[11] 4,097,090

[45] Jun. 27, 1978

[54] FLAP RETRACTION SYSTEM

[75] Inventors: Cecil Payne, 1515 E. Bilby Rd., Tucson, Ariz. 85706; Paul E. Payne, 1415 Maxmillian Pl., Tucson, Ariz. 85704

[73] Assignees: Cecil Payne; Paul Payne; Paula Fletcher, all of Tucson, Ariz.; part interest to each

[21] Appl. No.: 805,282

[22] Filed: Jun. 10, 1977

[51] Int. Cl.² .................................................. B62D 25/16
[52] U.S. Cl. ............................. 298/15 G; 280/154.5 R
[58] Field of Search ............... 298/1 SG; 293/73, 34; 280/154.5 R, 153 R, 152 R

[56] References Cited

U.S. PATENT DOCUMENTS

| | | | |
|---|---|---|---|
| 2,653,846 | 9/1953 | Wiley | 298/1 SG |
| 2,857,200 | 10/1958 | Hoppesch | 298/1 SG |
| 3,582,109 | 6/1971 | Moore | 298/1 SG X |
| 4,026,590 | 5/1977 | Holm | 293/73 |

*Primary Examiner*—Frank E. Werner
*Attorney, Agent, or Firm*—Cahill, Sutton & Thomas

[57] ABSTRACT

A retractable flap system is readily attachable to the dump box of a dump truck which includes a tail gate pivotally coupled to the upper portion of the rear end of the dump box. The retractable flap system includes a flap having first and second ends. An attachment bracket attaches the flap to the outer side of the tail gate. The attachment bracket includes a first end which is pivotably coupled to the outer side of the tail gate and a second end which is coupled to the upper portion of the flap. An air actuated ram is coupled to the outer side of the tail gate and to the attachment bracket in order to rotate the attachment bracket and thereby raise and lower the flap. In the raised position the flap is positioned nearly flush with the outer side of the tail gate and the lower end of the flap is positioned in the vicinity of the lower portion of the tail gate. In the lower position the flap serves its normal function of deflecting rocks and debris thrown from the rear tires of the truck.

10 Claims, 8 Drawing Figures

FLAP RETRACTION SYSTEM

BACKGROUND OF THE INVENTION

1. Field of the Invention

This invention relates to flap retractors for dump trucks, and more particularly, to pneumatically actuatable flap retracting systems.

2. Description of the Prior Art

Federal law presently requires that all large trucks used in interstate commerce include a mud flap/splash guard behind each set of rear wheels. These flaps are required to protect vehicles and pedestrians from water spray, rocks and other debris thrown from the rear wheels of trucks.

A serious difficulty arises when the required flaps are incorporated behind the rear wheels of dump trucks having tiltable dump beds. Flaps normally mounted on dump trucks are rigidly secured to the truck frame. As a truck discharges its load of sand, gravel or related material, a large pile of material forms beneath the rear of the vehicle. The material surrounds the flaps on all sides and effectively secures the flaps to the pile. Often great forces are applied to the flaps and their mounting brackets as the forward movement of the truck wrests the flaps from the grip of the recently discharged load. These forces over a period of time damage the flaps and occasionally rip them from their mounting brackets. Substantial fines can be imposed upon companies which operate trucks with damaged flaps and as a result flaps must be replaced often and at great expense.

Because of the magnitude of the replacement costs of flaps utilized on dump trucks, the prior art contains a multitude of different inventions which are designed to cope with this problem. Only a single prior art reference (U.S. Pat. No. 2,653,846 – Wiley) suggests attaching a flap to the tail gate of a dump truck. In actual use, however, the Wiley device is somewhat impractical. Here the flap is hingably attached to the lower lip of the tail gate and is pivoted up and out by a lever arm-push rod combination which is coupled to the upper end of the tail gate. Not only is this system complex and exceedingly difficult to retrofit to an already manufactured truck, but it creates a hazard in that the flap is designed to be extended away from the tail gate of the vehicle into a horizontal position where it creates a hazard to personnel.

Three related flap retraction systems are disclosed in the following U.S. Pat. Nos.: 3,582,109; 3,248,126; and 3,806,196. Each of these devices attempts to elevate the lower portion of the flap somewhat by providing a remotely actuatable cable attached to the lower end of the flap which folds the flap in half as the cable is retracted. Each of these devices requires that the flap be fabricated from a resilient material which can be repeatedly folded in this manner. Repeated bending of the flap is certain to fatigue the material from which the flap has been fabricated and most likely would reduce the operating life time of the flap. Furthermore, a high velocities a fairly resilient flap would tend to be deflected upwardly by the slipstream of the vehicle, permitting rocks and debris to be thrown into the area behind the truck. Retroactive installation of any of these devices on an existing truck would present difficulties due to the mechanical complexity of the system and the fact that many of the components are located on the under side of the dump bed of the truck.

U.S. Pat. Nos. 2,872,211 (Barrett) and 3,640,577 (Ducote) disclose systems which remove the truck flaps from the rear of the vehicle by swinging the flaps outwardly in the horizontal plane or upwardly in the vertical plane. There are two inherent disadvantages to these two systems. First, each of these flap systems must be suspended about a single point near the exterior edges of the dump bed which imposes serious wear problems on the flap's suspension system. Second, the retraction of the mud guards causes an area outside the perimeter of the truck to be swept which may injure a person or cause damage to the flap when it contacts an object in the area to be swept. In the retracted position, the flap and the flap extension system are highly vulnerable to damage.

Another method of retracting flaps is disclosed in U.S. Pat. Nos. 2,857,200 (Hoppesch) and 2,721,760 (Lapham). Each of these devices actually retracts the entire flap into a position above the upper surface of the rear wheel and parallel to the lower surface of the dump bed. The difficulty with these devices is that it is virtually impossible to retrofit them to existing trucks in a fleet due to the complicated interconnections and attachments required to be made to various portions of the truck. Inspection and maintenance of these devices presents serious problems.

U.S. Pat. Nos. 3,788,668 (Perger) and 3,794,383 (France) disclose flap retraction systems useable only on dump trucks having an upwardly slanted end portion of the dump bed. The Perger device requires that the tail gate extend a distance beyond the flap attachment point at least equal to the length of the flap. Neither of these devices is adaptable for use on a conventional dump truck having a horizontally oriented dump bed which terminates immediately behind the rear wheels of the truck.

Other less relevant devices for dump trucks are disclosed in U.S. Pat. Nos. 3,580,604 (Overend) and 2,831,702 (Evans).

SUMMARY OF THE INVENTION

It is therefore a primary object of the present invention to provide a retractable flap system which elevates the flaps of a dump truck into a position where it is virtually impossible for material dumped from the truck to come in contact with even the lowest portion of the flaps.

Another object of the present invention is to provide a retractable flap system which is readily attachable to the outer side of the tail gate of a dump truck.

Yet another object of the present invention is to provide a retractable flap system which contains a minimum number of moving parts, all of which are readily accessible to a person standing upright behind the tail gate of the truck.

Still another object of the present invention is to provide a retractable flap system which does not bend or otherwise deform the flap.

Still another object of the present invention is to provide a retractable flap system which can be powered by the high pressure air system of a dump truck.

Yet another object of the present invention is to provide a retractable flap system which can be remotely controlled by the operator of a dump truck or which can be automatically controlled to retract the flaps prior to dumping operations.

Briefly stated, and in accord with one embodiment of the invention, a retractable flap system is readily attachable to a dump truck which includes a dump box and a tail gate pivotally coupled to the upper portion of the rear end of the dump box. The tail gate of the dump box includes an outer side and a bottom.

The retractable flap system comprises at least one flap having first and second ends and attachment means for attaching the flap to the outer side of the tail gate. The attachment means includes a first end pivotably coupled to the outer side of the tail gate and a second end coupled to the first end of the flap.

Actuator means is coupled to the outer side of the tail gate and to the attachment means in order to rotate the attachment means and thereby raise and lower the flap between a first position wherein the first end of the flap lies entirely below the tail gate and a second position wherein the first end of the flap is elevated above the bottom of the tail gate. In this manner the flap can be elevated with respect to the tail gate prior to dumping operations to prevent damage to the flap.

DESCRIPTION OF THE DRAWING

The invention is pointed out with particularly in the appended claims. However, other objects and advantages, together with the operation of the invention, may be better understood by reference to the following detailed description taken in connection with the following illustrations wherein:

DESCRIPTION OF THE PREFERRED EMBODIMENT

In order to better illustrate the advantages of the invention and its contributions to the art, a preferred hardware embodiment of the invention will now be described in some detail.

Figure 1:
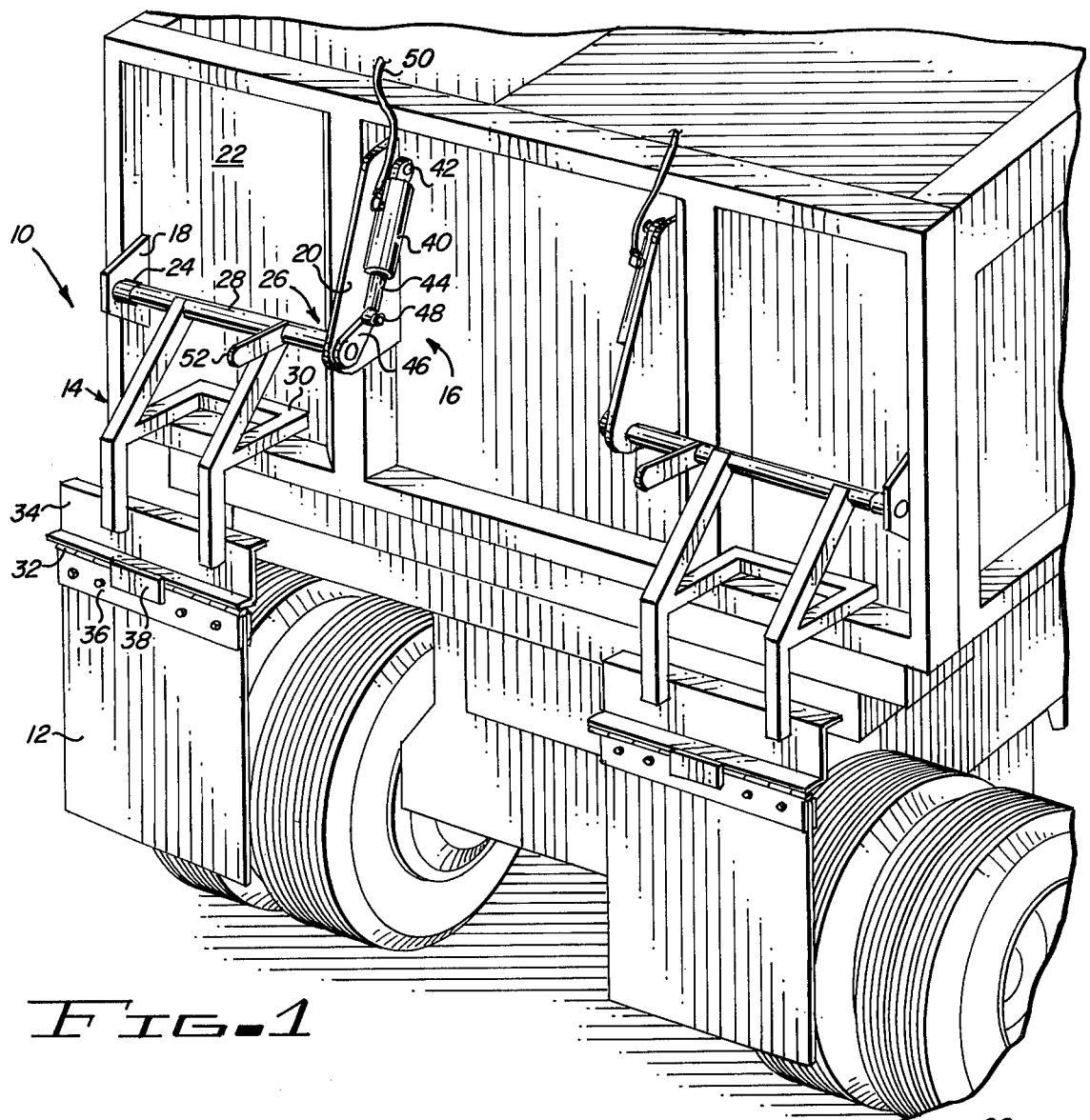
FIG. 1 is a partially cut away perspective view of the rear end of a dump truck illustrating the retractable flap system of the present invention in the extended position.

Referring to FIG. 1, a single working element of the retractable flap system 10 includes a flap 12, attachment means 14 and actuator means 16.

The first end of attachment means 14 includes vertically oriented brackets 18 and 20 which are attached to the outer side of the tail gate 22 of the dump truck by welding or other mechanical means. Bearing means in the form of a pair of sleeve bearings 24 and 26 permit a horizontally oriented shaft 28 to pivot freely with respect to brackets 18 and 20.

In FIG. 1 the retractable flap system is shown in the first or extended position where it is maintained by a horizontally oriented bracket extension 30 which is coupled to the mid portion of attachment means 14 and rests against the outer side of tail gate 22. A hinge 32 pivotally couples the lower end 34 of attachment means 14 to the upper portion of flap 12. Flap 12 is sandwiched between a pair of rectangular shaped metal plates, such as metal plate 36, to provide a highly secure means for attaching flap 12 to hinge 32.

In order to prevent flap 12 from being deflected in a rearward direction during high speed travel of the truck, stop means in the form of a metal tab 38 is rigidly attached to the central portion of metal plate 34. The abutting contact between plate 36 and tab 38 prevents rearward deflection of flap 12 when the retractable flap system is in the extended position illustrated in FIG. 1.

Actuator means 16 includes a ram of pneumatically actuated air cylinder 40, the body of which is coupled to bracket 20 by connector 42 while the moveable shaft 44 thereof is pivotably coupled to lever arm 46 by connector 48. An air supply line 50 is coupled to the normally available high pressure air supply of the dump truck and supplies air under pressure to air cylinder 40.

A stop bracket 52 extends from shaft 28. When stop bracket 52 comes in contact with the outer side of tail gate 22, it stops the rotary motion of attachment means 14 and thereby determines the position of the retractable flap system when retracted.

Figures 2A, 2B, 2C:
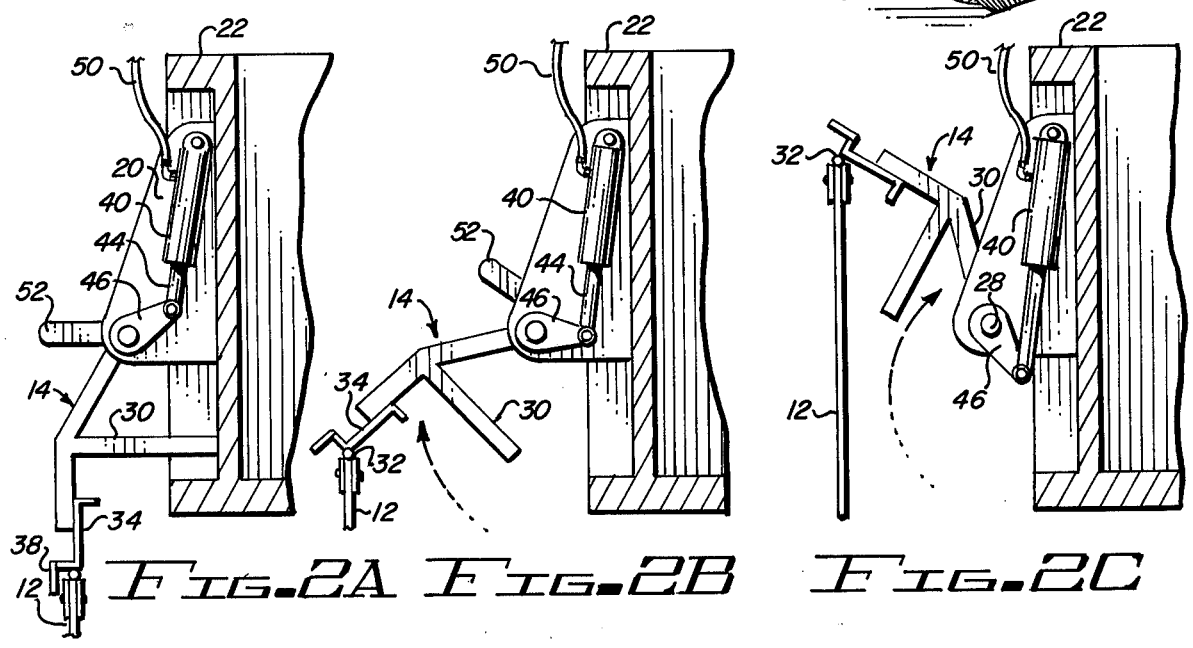
FIG. 2a is a partially cut away elevational view of the left half of the dual element flap retraction system shown in FIG. 1, illustrating the flap in the first or extended position.
FIG. 2b illustrates the retractable flap system in an intermediate position.
FIG. 2c illustrates the retractable flap system in the second or retracted position.

The operation of the retractable flap system of the present invention will now be described by referring to FIG. 2. FIG. 2a illustrates the retractable flap system in the first or extended position. In FIG. 2b a source of high pressure air has been coupled to air supply line 50 which causes shaft 44 to extend at a controlled rate from air cylinder 40. The extension of shaft 44 causes lever arm 46 to rotate. Since lever 46 is directly coupled to shaft 28, attachment means 44 is caused to rotate in a clockwise direction which produces an upward movement of flap 12. Flap 12 is maintained in a vertical position since it is pivotally coupled to metal plate 34 by hinge 32. FIG. 2c illustrates the retractable flap system of the present invention in the second or fully retracted position. The actual final position of flap 12 is determined by a number of design factors such as the angular position of stop bracket 52 with respect to shaft 28 and the maximum extension of shaft 44 from air cylinder 40.

Figure 3:
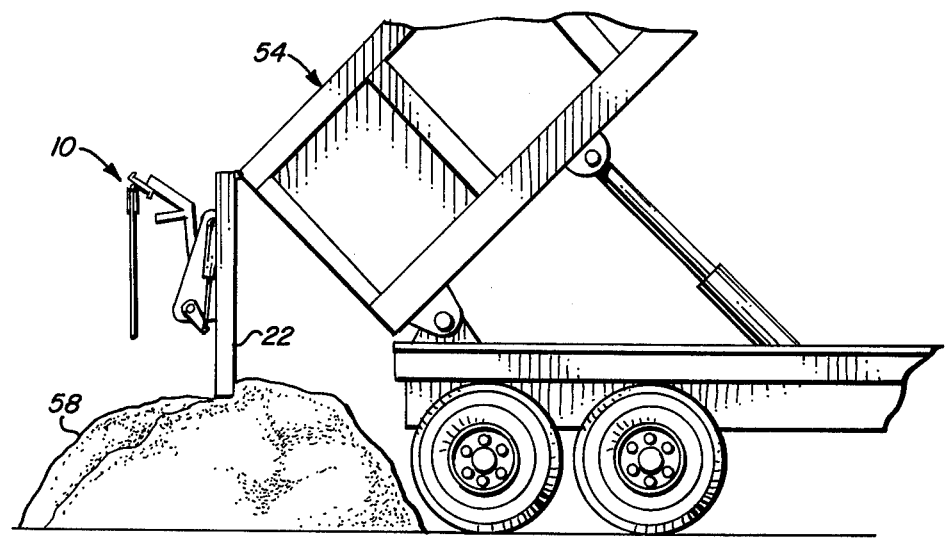
FIG. 3 is a partially cut away elevational view of a dump truck having its dump box in an elevated position with the retractable flap system of the present invention attached to the tail gate thereof and in a retracted position.

FIG. 3 clearly illustrates the advantages of the present invention over prior art flap retraction systems. When dump box 54 of the dump truck is in the elevated position as shown, tail gate 22 which is freely suspended from the upper portion of dump box 54 is maintained in the vertical position. Due to the relative positioning of the retractable flap system 10 with respect to the pile of material dispensed from the rear of dump box 54, it would be virtually impossible for any material within the pile to physically harm the retractable flap system. Even if the height of the pile 58 extended above the lower portion of tail gate 22, the flap retraction system would not be damaged when the truck pulled forward since the tail gate would merely be deflected to the rear over the top of the pile.

Figure 4:
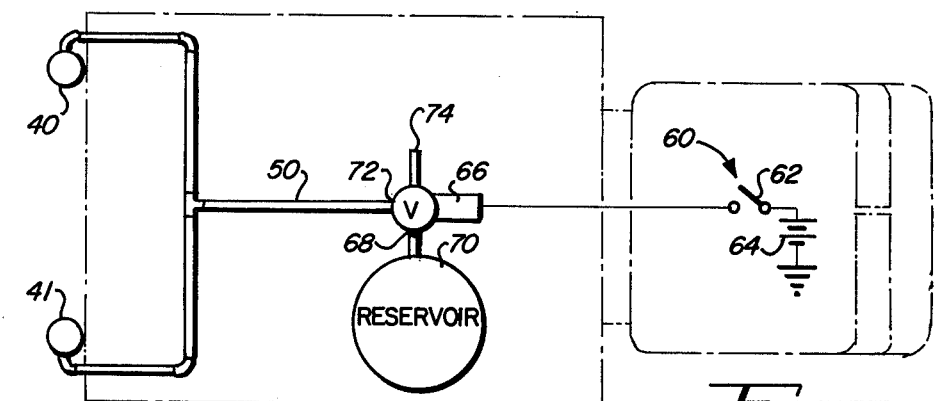
FIG. 4 is a schematic representation of the control means for the retractable flap system of the present invention.

FIG. 4 is a schematic diagram of control means 60 of the present invention. Control means 60 is an element of actuator means 16 and controls the source of air under pressure received from the truck to extend and retract the shaft of air cylinder 40.

Control means 60 includes a switch 62 which controls the flow of electrical current between the battery 64 of the truck and a solenoid actuated valve 66. Valve 66 has three ports. Port 68 is coupled to the high pressure air supply 70 of the truck; port 72 is coupled to air supply line 50; and port 74 is vented directly into the atmosphere.

When switch 62 is in the open position as shown in FIG. 4, valve 66 is actuated to discharge the air in air supply line 50 through discharge port 74. When switch 62 is closed, valve 66 is actuated to couple high pressure air supply 70 to air supply line 50 which results in the actuation of air cylinders 40 and 41 and elevates the flap system from the first position to the second position.

Figure 5:
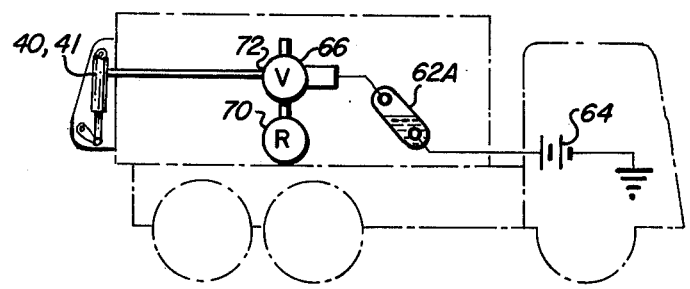
FIG. 5 illustrates a dump truck having a control means including a position sensitive switch for actuating the retractable flap system of the present invention.

Switch 62 can be manually operated by the truck driver or as shown in FIG. 5 switch 62 can be a gravity responsive switch such as a mercury switch which actuates valve 66 automatically whenever the dump bed of the truck is elevated beyond a predetermined angle above the horizontal.

Figure 6:
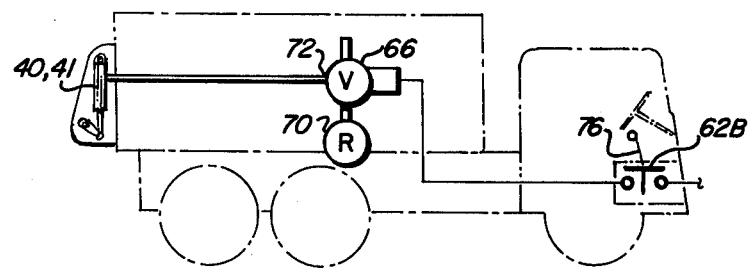
FIG. 6 illustrates a control means for a retractable flap system of the present invention which retracts the flaps in response to a predetermined position of the gear shift lever of the dump truck.

FIG. 6 illustrates another method of actuating the flap retraction system of the present invention. In this configuration switch 62 of control means 60 is coupled to the gear selector of the truck. Whenever gear selector lever 76 is placed in reverse, as would occur when a dump truck is backed into position to discharge its load, switch 62 is actuated to provide air to air supply line 50.

In most cases a retrofit installation of the present invention will be simplified by coupling switch 62 directly to the dump bed actuation lever or by installing it on the instrument panel of the truck.

It will be apparent to those skilled in the art that the disclosed retractable flap system may be modified in numerous other ways and may assume other embodiments other than the preferred forms specifically set out and described above. The preferred embodiment has been described as having a pair of air cylinders, but in some installations it may be desirable to utilize a single air cylinder to drive a single shaft 28 which extends without interruption from the left side to the right side of tail gate 22. In this embodiment the single air cylinder would simultaneously elevate or lower both the left and right flaps. Furthermore, various different types of air cylinders or hydraulically actuated cylinders can be utilized to serve as the actuator means of the present invention. Accordingly, it is intended by the appended claims to cover all such modifications of the invention which fall within the true spirit and scope of the invention.

What is claimed is:

1. A retractable flap system for a dump truck including a dump box and a tail gate pivotally coupled to the upper portion of the rear end of the dump box, the tail gate having an outer side and a bottom, said flap retractor comprising in combination:
    (a) a flap having first and second ends;
    (b) attachment means for attaching said flap to the outer side of the tail gate, said attachment means having a first end pivotably coupled to the outer side of the tail gate and a second end coupled to the first end of said flap; and
    (c) actuator means coupled to the outer side of the tail gate and to said attachment means for rotating said attachment means and thereby raising and lowering said flap between a first position wherein the first end of said flap lies entirely below the tail gate and a second position wherein the first end of said flap is elevated above the bottom of the tail gate;
    whereby said flap can be elevated with respect to the tail gate prior to dumping operations to prevent damage to said flap.

2. The retractable flap system according to claim 1 wherein the first end of said attachment means includes bearing means.

3. The retractable flap system according to claim 2 further including hinge means interposed between the second end of said attachment means and the first end of said flap for permitting said flap to be maintained in a vertical position when said flap is rotated between the first position and the second position.

4. The retractable flap system according to claim 3 wherein said hinge means further includes stop means coupled to said hinge means and extending downwardly therefrom for preventing rearward deflection of said flap as a result of air loads imposed by high speed operation of the truck.

5. The retractable flap system according to claim 1 wherein said actuator means further includes a ram.

6. The retractable flap system according to claim 5 wherein said ram includes a pneumatically operated air cylinder.

7. The retractable flap system according to claim 5 wherein said ram includes a pneumatically operated air shock absorber.

8. The retractable flap system according to claim 1 wherein said actuator means includes:
    (a) a pneumatically operated air shock absorber; and
    (b) a supply of air under pressure coupled to said air shock absorber for operating said air shock absorber.

9. The retractable flap system according to claim 8 wherein said actuator means further includes control means for controlling the flow of said air supply to operate said flap between the first position and the second position.

10. The retractable flap system according to claim 1 wherein said flap is fabricated from a semi-rigid material.

* * * * *